United States Patent
Chiang (10) Patent No.: US 6,772,664 B2
(45) Date of Patent: Aug. 10, 2004

(54) VERTICAL BAND SAW MACHINE WITH A SAWDUST COLLECTING MECHANISM

(76) Inventor: Pei-Lieh Chiang, No. 12, Nan-Ping Rd., Nan Dist., Taichung City (TW)

(*) Notice: Subject to any disclaimer, the term of this patent is extended or adjusted under 35 U.S.C. 154(b) by 67 days.

(21) Appl. No.: 10/315,280

(22) Filed: Dec. 9, 2002

(65) Prior Publication Data

US 2004/0007109 A1 Jan. 15, 2004

(30) Foreign Application Priority Data

Jul. 12, 2002 (TW) .................................... 91210642 U (51) Int. Cl.$^7$ ............................................... B26D 7/06
(52) U.S. Cl. ...................... 83/100; 83/788; 144/252.1; 451/453
(58) Field of Search ............................ 83/98, 788, 100, 83/169, 786, 662, 783, 784, 785, 471.3, 486.1, 490, 167, 477.1, 820, 835; 144/252.2, 252.1, 136.9; 451/449, 453, 178, 190, 456; 409/136, 137; 15/300.1, 312.1, 312.2, 415.1

(56) References Cited

U.S. PATENT DOCUMENTS

| | | | |
|---|---|---|---|
| 1,789,569 A | * | 1/1931 | Tannewitz ..................... 83/98 |
| 3,669,163 A | * | 6/1972 | Crane .......................... 30/380 |
| 4,061,126 A | * | 12/1977 | Schlangen .................... 125/21 |
| 4,063,478 A | * | 12/1977 | Stuy ............................. 83/100 |
| 4,491,047 A | * | 1/1985 | Butkiewicz et al. .......... 83/817 |
| 5,167,215 A | * | 12/1992 | Harding, Jr. ............. 125/13.01 |
| 5,632,578 A | * | 5/1997 | McCurry et al. ........... 409/136 |
| 5,713,164 A | * | 2/1998 | Ryan ......................... 52/169.7 |
| 5,802,939 A | * | 9/1998 | Wiand et al. ................. 83/169 |
| 6,293,321 B1 | * | 9/2001 | Chiang .................... 144/252.1 |
| 6,382,278 B1 | * | 5/2002 | Liao et al. ............... 144/252.1 |
| 6,405,623 B2 | * | 6/2002 | Lavallee ........................ 83/13 |
| 6,416,403 B1 | * | 7/2002 | Chiang ....................... 451/453 |
| 6,470,778 B1 | * | 10/2002 | Kaye et al. ............. 144/252.1 |

* cited by examiner

Primary Examiner—Allan N. Shoap
Assistant Examiner—Ghassem Alie
(74) Attorney, Agent, or Firm—Brian T. Sattizahn; McNees Wallace & Nurick LLC (57) ABSTRACT

A vertical band saw machine includes an endless band saw trained on a lower blade mounting pulley which is driven by an output shaft of a motor for sawing a workpiece placed on a worktable. A sawdust collecting member is mounted on a lower support below the worktable, and has first and second sawdust passageways with first and second intake ports disposed above and under the worktable in the vicinity of the blade. An impeller is rotatable coaxially with the lower blade mounting pulley so as to draw sawdust from the sawdust collecting member into a blower casing for discharge through a discharge port.

9 Claims, 9 Drawing Sheets

VERTICAL BAND SAW MACHINE WITH A SAWDUST COLLECTING MECHANISM

CROSS-REFERENCE TO RELATED APPLICATION

This application claims priority of Taiwanese Application No. 091210642, filed on Jul. 12, 2002.

BACKGROUND OF THE INVENTION

1. Field of the Invention

This invention relates to a vertical band saw machine, more particularly to a vertical band saw machine with a sawdust collecting mechanism.

2. Description of the Related Art

Figure 1:
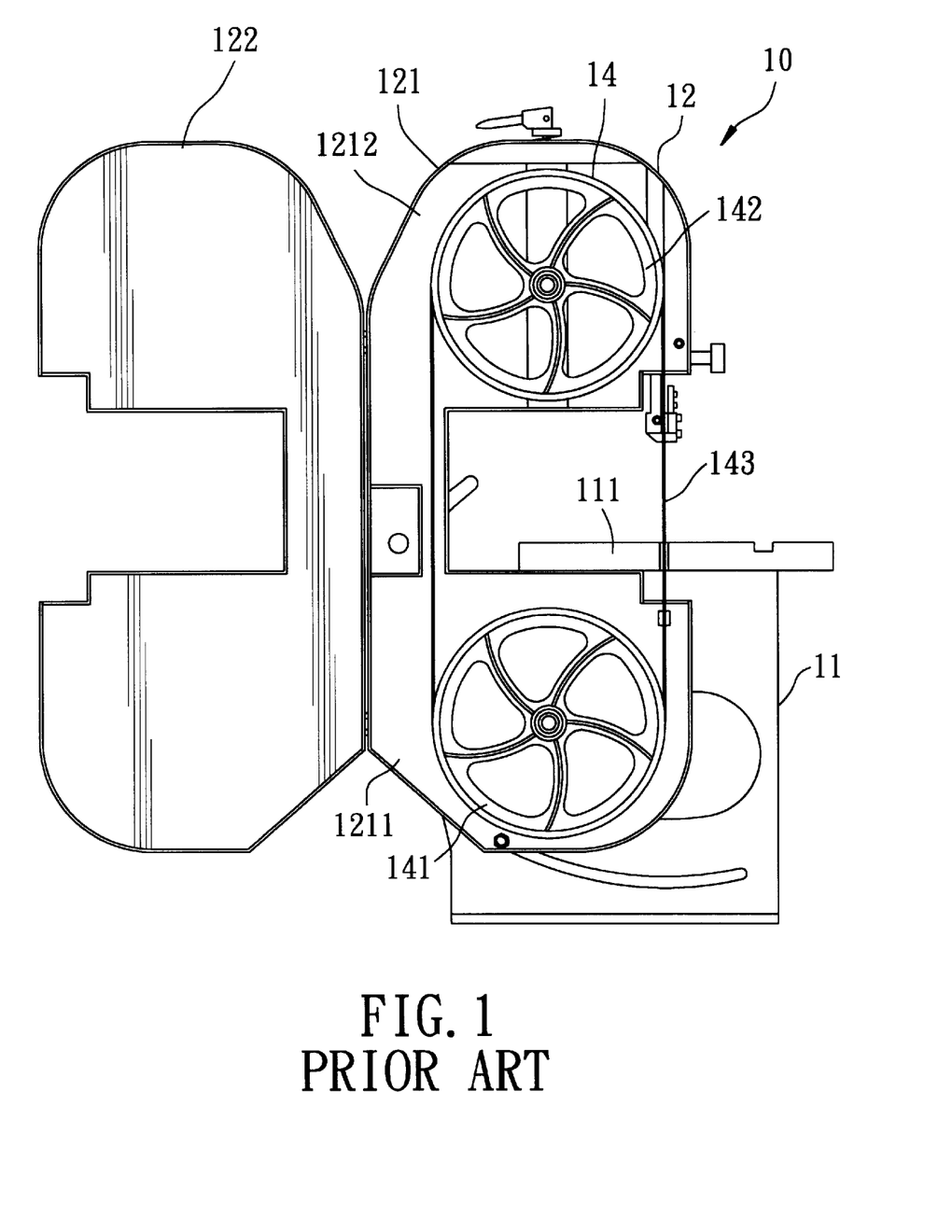
FIG. 1 is a schematic side view of a conventional vertical band saw machine in a state when a column is opened.
Figure 2:
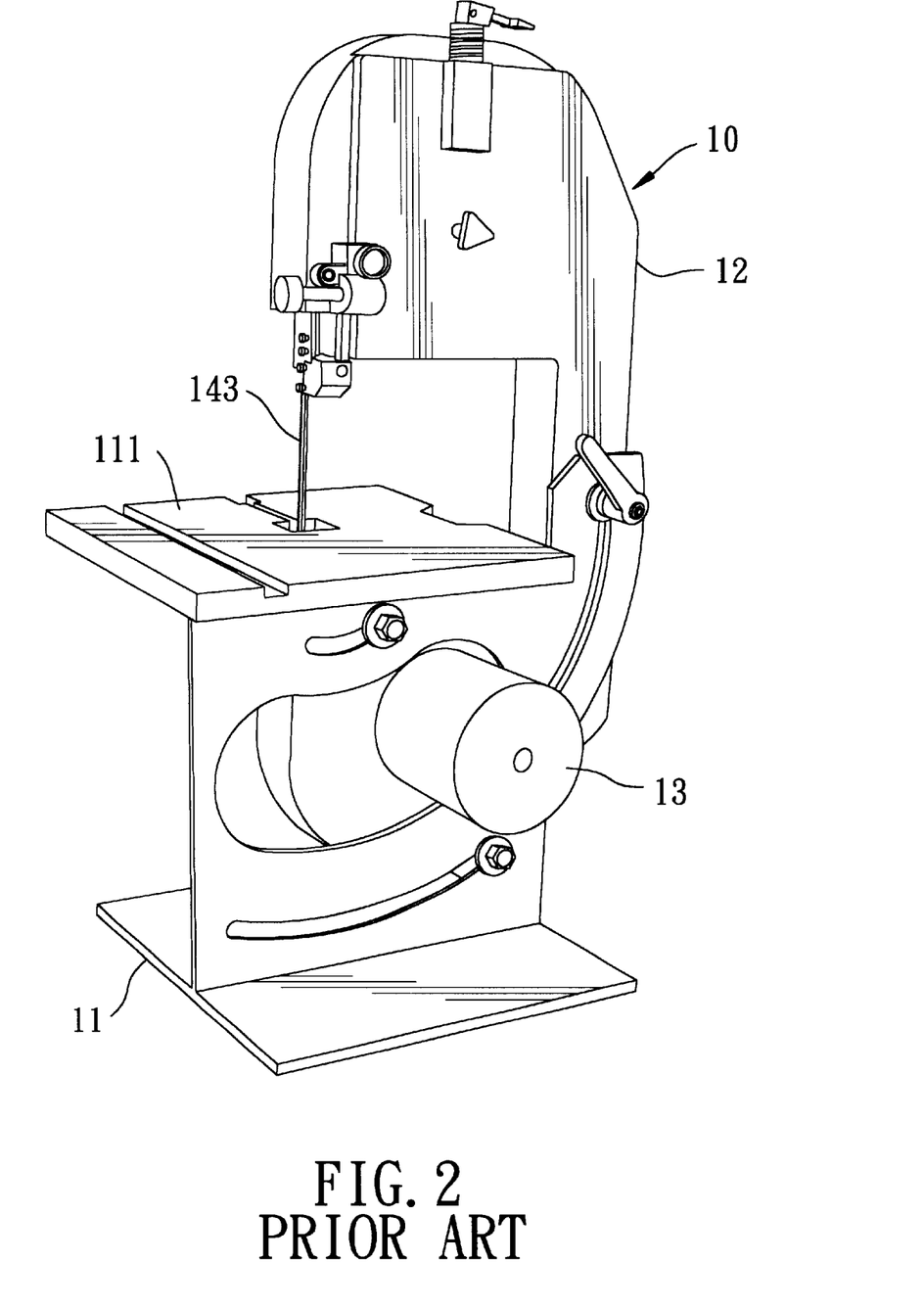
FIG. 2 is a perspective view of the conventional vertical band saw machine.

Referring to FIGS. 1 and 2, a conventional vertical band saw machine 10 is shown to include a base 11 with a worktable 111 for supporting a workpiece (not shown), a column 12 mounted on the base 11 and including two housing portions 121,122 hinged to each other, a motor 13, and a band saw unit 14. The band saw unit 14 includes upper and lower blade mounting pulleys 142,141 which are mounted rotatably on upper and lower supports 1212,1211 of the housing portion 121, and an endless band saw blade 143 which is trained on the pulleys 142,141 and which passes through the worktable 111. When the motor 13 is actuated, the lower blade mounting pulley 141 is driven to rotate the band saw blade 143 along a running route so as to saw the workpiece on the worktable 111. Since a large amount of sawdust is formed and scattered during the sawing operation, collecting means is needed to collect the sawdust.

SUMMARY OF THE INVENTION

The object of the present invention is to provide a vertical band saw machine which has a sawdust collecting mechanism to collect sawdust during a sawing operation.

According to this invention, the vertical band saw machine includes a base with a worktable for supporting a workpiece thereon. A column is mounted on the base, and has upper and lower supports spaced apart from each other in an upright direction so as to confine a working space. The worktable is disposed to extend into the working space and between the upper and lower supports, and has a hole extending therethrough in the upright direction.

A motor has an output shaft rotatable to deliver a drive force. A lower blade mounting pulley is driven by the drive force of the output shaft, and is mounted on and is rotatable relative to the lower support about an axis oriented in a transverse direction relative to the upright direction. An endless band saw blade is trained on the lower blade mounting pulley, and passes through the hole in the worktable. A blower casing has proximate and distal walls opposite to each other in the transverse direction, and respectively proximate to and distal from the lower blade mounting pulley to confine a casing space, and a discharge port which is disposed between the proximate and distal walls, which extends radially to the axis, and which is in fluid communication with the casing space. One of the proximate wall and the distal wall has an inlet port formed therethrough.

A sawdust collecting member is mounted on the lower support, and has an accommodation chamber therein, which is in fluid communication with and upstream of the inlet port. The sawdust collecting member further has first and second sawdust passageways. The first sawdust passageway has a first intake port which is disposed above the worktable and in the vicinity of the hole to collect sawdust emanating and scattering around and above the worktable as a result of a sawing action, and a first outlet port which is disposed under the worktable and downstream of the first intake port and in fluid communication with the accommodation chamber. The second sawdust passageway has a second intake port which is disposed under the worktable and in the vicinity of the hole to collect sawdust falling through the hole, and a second outlet port which is disposed downstream of the second intake port and in fluid communication with the accommodation chamber.

An impeller is received in the casing space, and is rotatable coaxially with the lower blade mounting pulley about the axis so as to draw the sawdust from the accommodation chamber into the casing space for discharge through the discharge port.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 3:
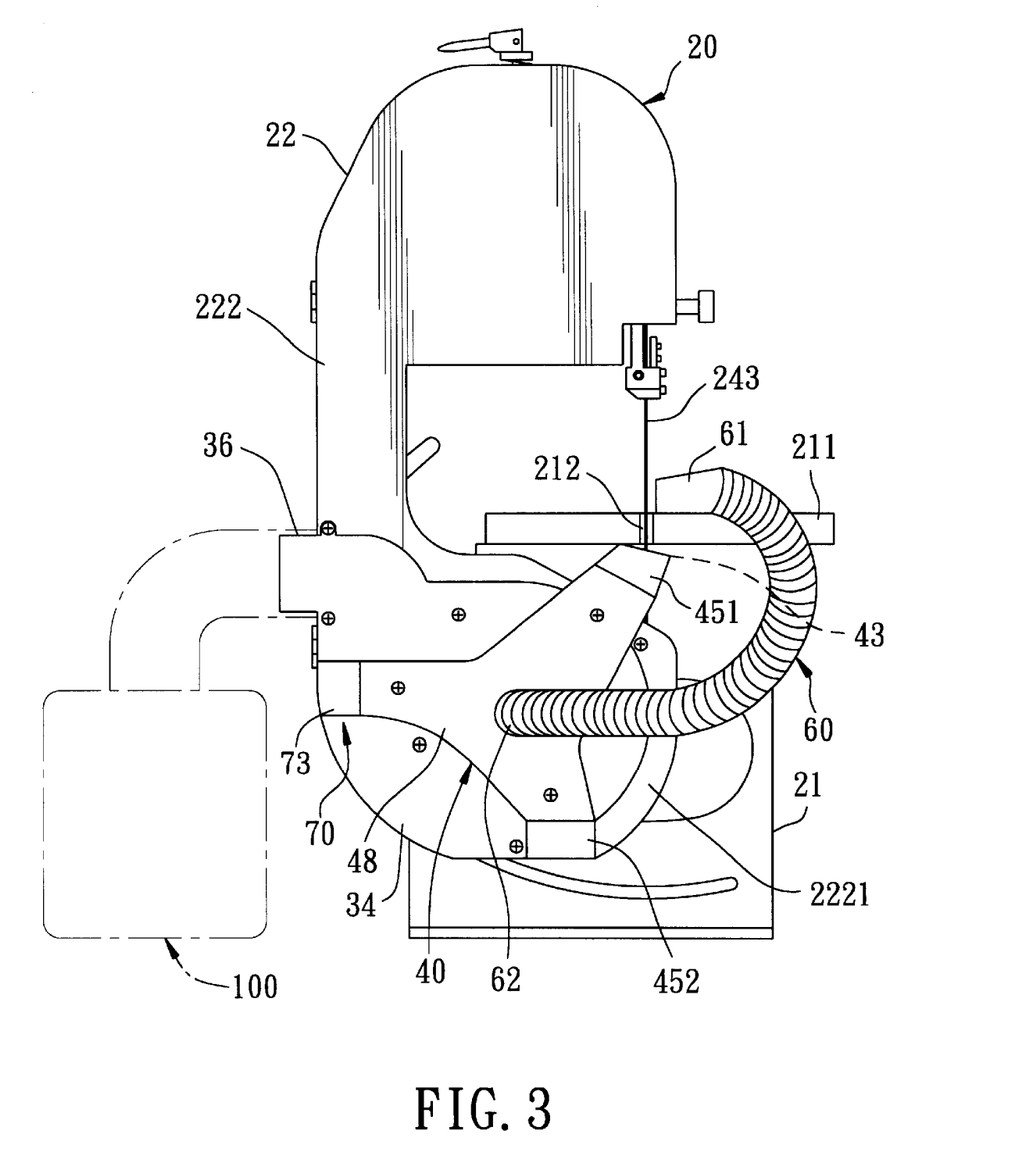
FIG. 3 is a schematic side view of a preferred embodiment of a vertical band saw machine according to this invention.
Figure 4:
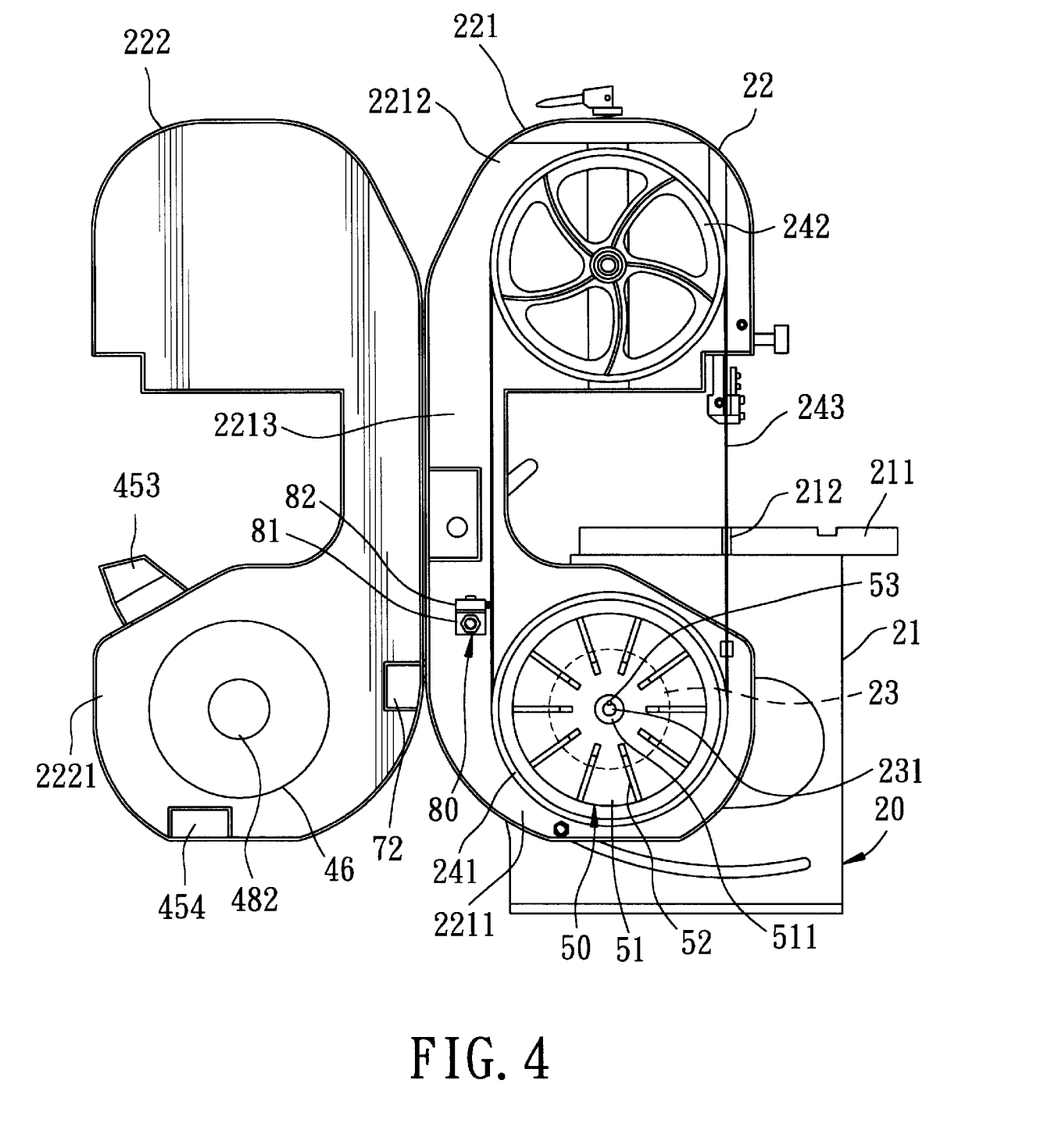
FIG. 4 is a schematic side view of the preferred embodiment in a state when a column is opened.

Referring to FIGS. 3 and 4, the preferred embodiment of a vertical band saw machine 20 according to the present invention is shown to comprise a base 21 with a worktable 211 for supporting a workpiece (not shown) thereon. The worktable 211 has a hole 212 which extends therethrough in an upright direction.

A column 22 is mounted on the base 21, and includes two housing portions 221,222 which are hinged to each other. The housing portion 221 has upper and lower supports 2212,2211 which are spaced apart from each other in the upright direction so as to confine a working space such that the worktable 211 extends into the working space and between the upper and lower supports 2212,2211, and a rear body 2213 which interconnects the upper and lower supports 2212,2211 and which is disposed rearwardly of the worktable 211.

A motor 23 has an output shaft 231 which extends through the lower support 2211 and which is rotatable about an axis oriented in a transverse direction relative to the upright direction to deliver a drive force.

A lower blade mounting pulley 241 is mounted on the lower support 2211, and is coupled securely and is rotated with the output shaft 231 of the motor 23 by means of a securing key 53 so as to be driven by the drive force of the output shaft 231 to rotate about the axis. An upper blade mounting pulley 242 is rotatably mounted on the upper support 2212.

An endless band saw blade 243 is trained on the upper and lower blade mounting pulleys 242,241, and has a front segment which passes through the hole 212, and a rear segment which extends in the upright direction and which is received in the rear body 2213 so as to rotate along a running route.

Figure 5:
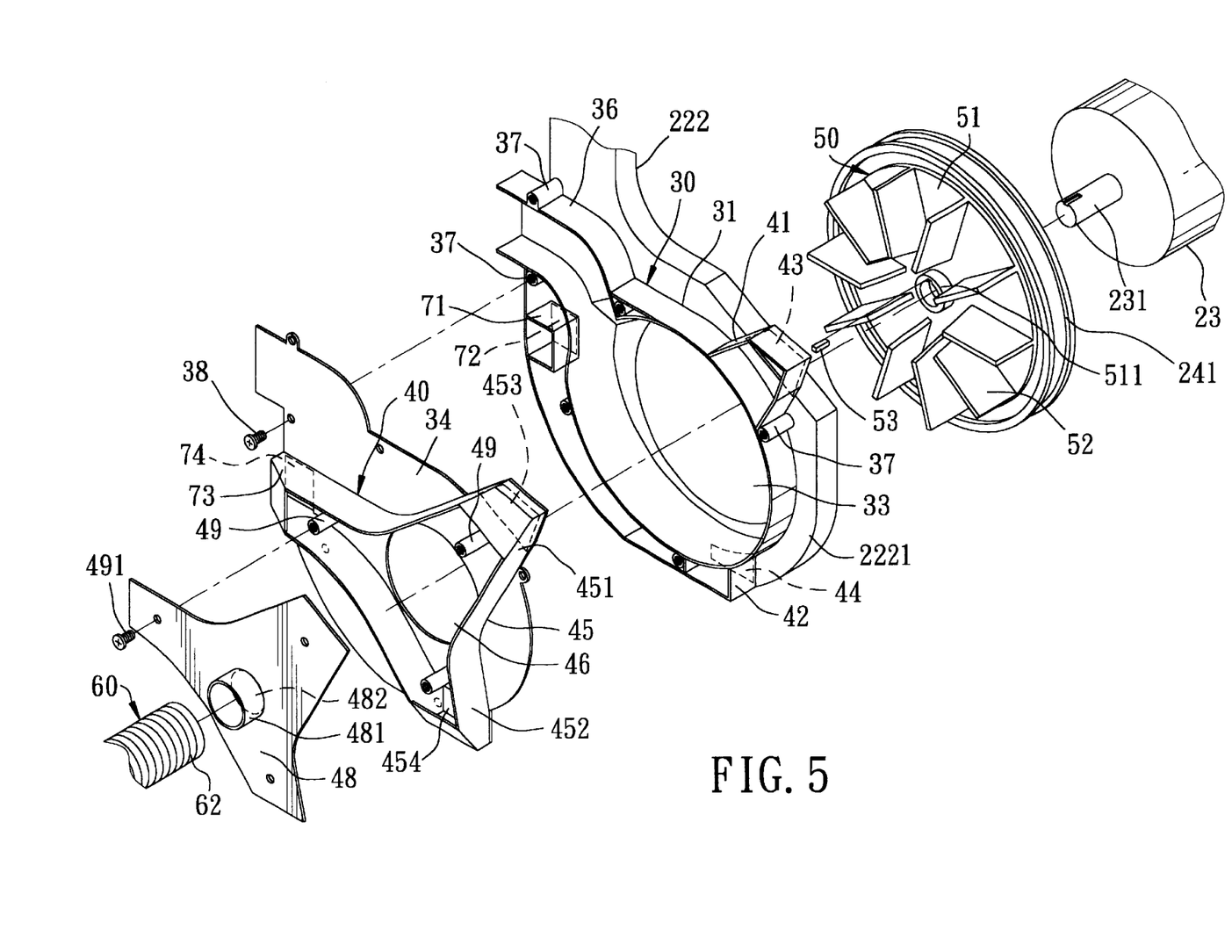
FIG. 5 is an exploded perspective view of a sawdust collecting mechanism of the preferred embodiment.

With reference to FIGS. 3 to 5, a sawdust collecting mechanism includes a blower casing 30, a sawdust collecting member 40, and an impeller 50.

Figure 7:
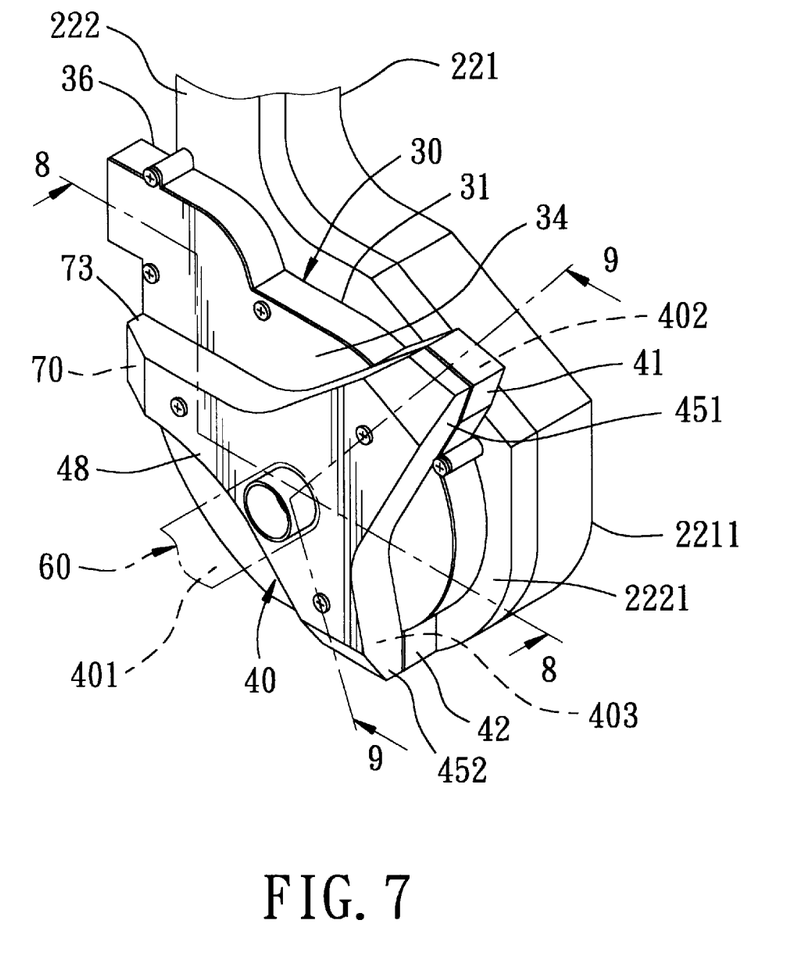
FIG. 7 is a perspective view of the sawdust collecting mechanism of the preferred embodiment.
Figure 8:
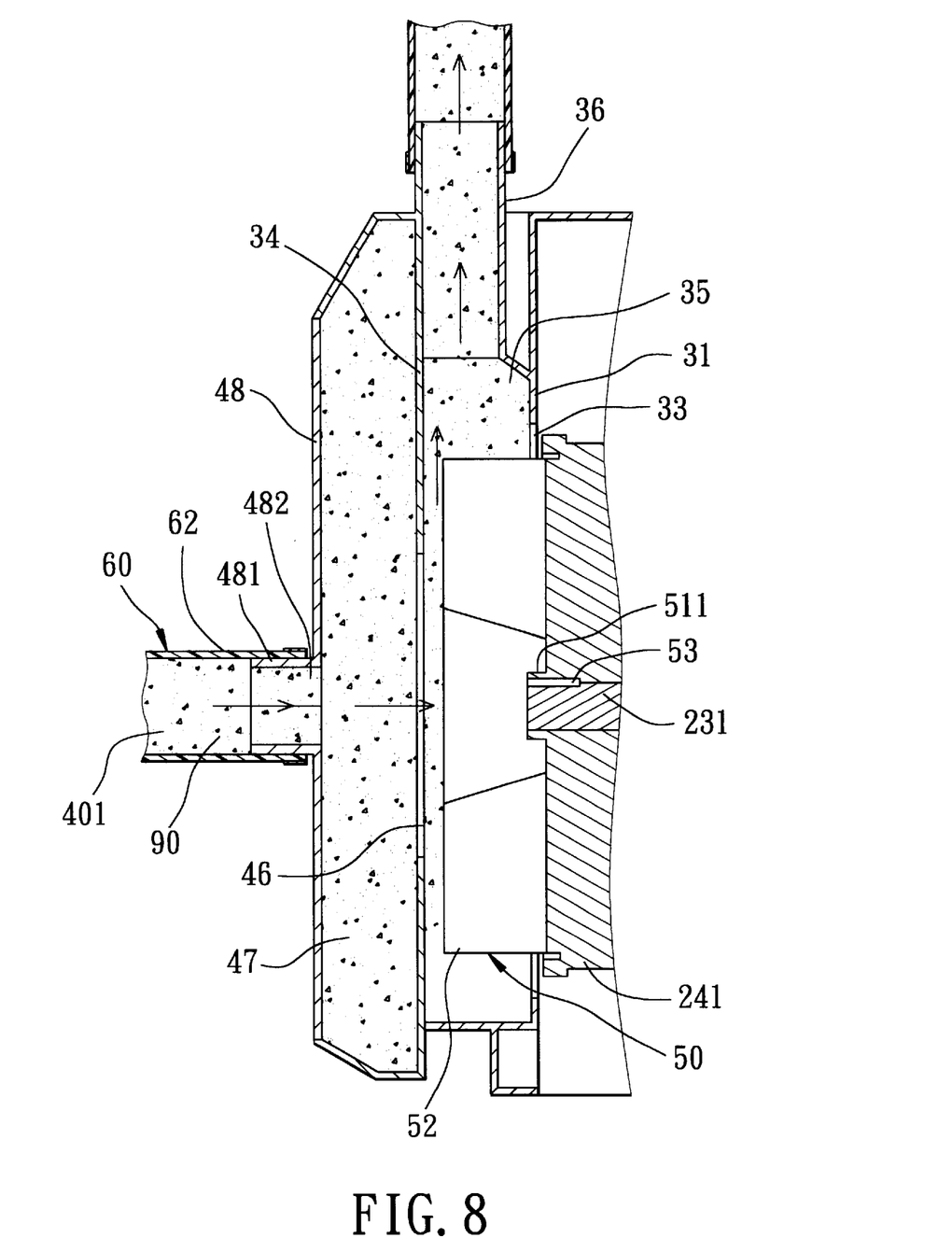
FIG. 8 is a sectional view of the sawdust collecting mechanism shown in FIG. 7, taken along lines 8—8 thereof.

Referring to FIGS. 5, 7 and 8, the blower casing 30 is formed on a lower part 2221 of the housing portion 222, and has proximate and distal walls 31,34 opposite to each other in the transverse direction and respectively proximate to and distal from the lower blade mounting pulley 241. The proximate and distal walls 31,34 are connected to each other by means of screws 38 and bore seats 37 so as to confine a casing space 35. In addition, a discharge port 36 is disposed between the proximate and distal walls 31,34, extends radially to the axis, and is in fluid communication with the casing space 35. The proximate and distal walls 31,34 have an impeller inserting hole 33 and an inlet port 46 formed therethrough, respectively.

Referring again to FIGS. 5, 7 and 8, the sawdust collecting member 40 is mounted on the lower support 2211 and the lower part 2221 of the housing portion 222 adjacent to the blower casing 30, and includes a collecting housing 45 disposed on the distal wall 34, and a cover plate 48 secured to the collecting housing 45 by means of screws 491 and bore seats 49 so as to confine an accommodation chamber 47 therein, which is in fluid communication with and upstream of the inlet port 46. The sawdust collecting member 40 has a first sawdust passageway 401 which is confined by a coupling head 481 disposed on the cover plate 48, and a flexible connecting tube 60, and second, third and fourth sawdust passageways 402,403,70 which are confined by three collecting seats 41,42,71 disposed on the lower part 2221 and three corresponding portions 451,452,73 extending from the collecting housing 45.

The coupling head 481 has an inlet hole 482 which extends in a route along the axis. The flexible connecting tube 60 has an inlet end 61 which serves as a first intake port and which is disposed above the worktable 211 and in the vicinity of the hole 212, and an outlet end 62 which extends from the inlet end 61 to serve as a first outlet port and which is connected to the coupling head 481 so as to be in fluid communication with the accommodation chamber 47 through the inlet hole 482. As such, sawdust 90 emanating and scattering around and above the worktable 211 as a result of a sawing action can be collected from the inlet end 61 into the accommodation chamber 47.

Figure 9:
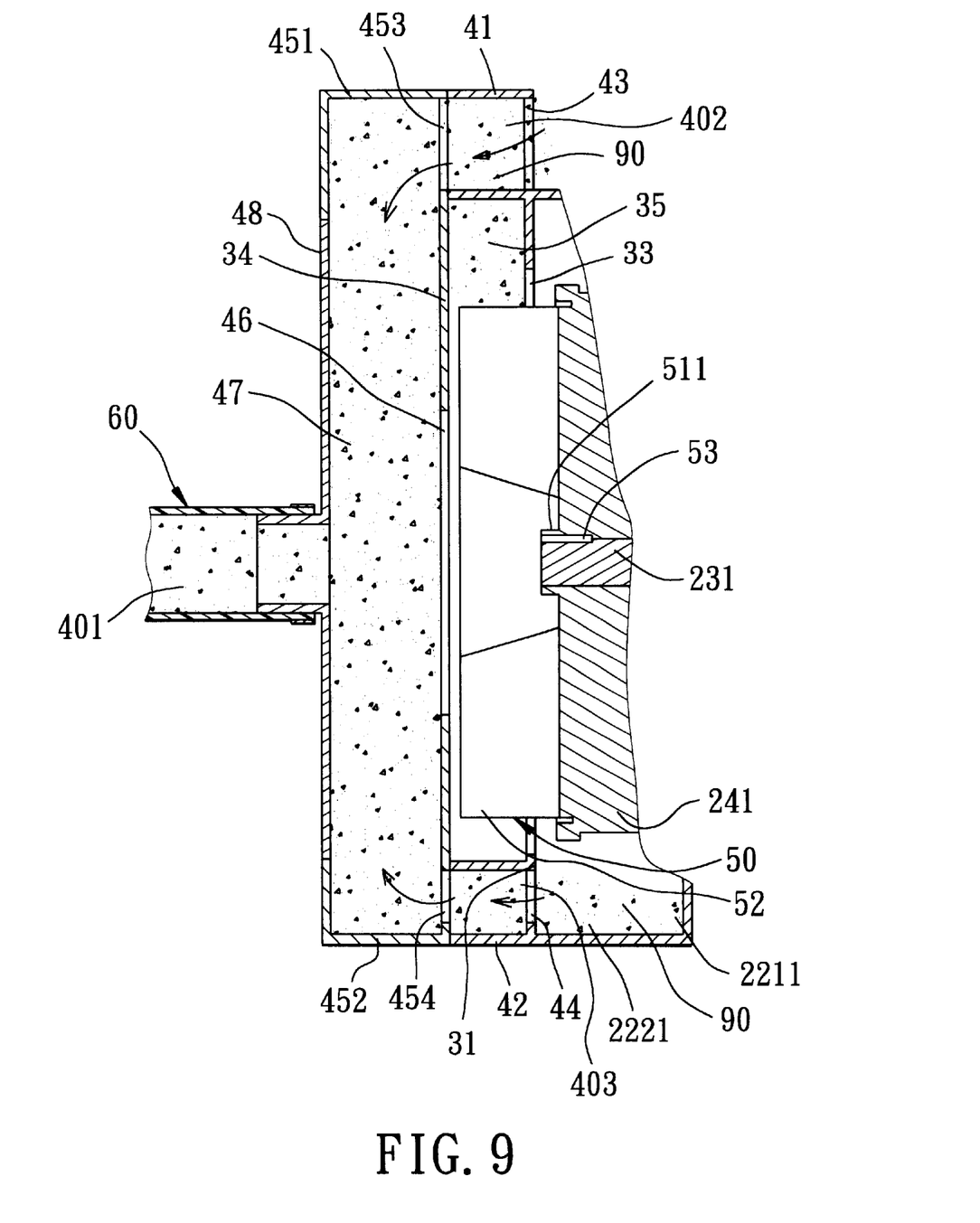
FIG. 9 is another sectional view of the sawdust collecting mechanism shown in FIG. 7, taken along lines 9—9 thereof.

With reference to FIGS. 3, 5 and 9, the second sawdust passageway 402 has a second intake port 43 which is disposed under the worktable 211 and in the vicinity of the hole 212 to collect sawdust 90 falling through the hole 212, and a second outlet port 453 which is disposed downstream of the second intake port 43 and in fluid communication with the accommodation chamber 47.

With reference to FIGS. 3, 5 and 9, the third sawdust passageway 403 is disposed below the second sawdust passageway 402. The third sawdust passageway 403 has a third intake port 44 which is disposed to collect sawdust falling to a bottom side of the lower support 2211, and a third outlet port 454 which is disposed downstream of the third intake port 44 and in fluid communication with the accommodation chamber 47.

With reference to FIGS. 3, 4, 5 and 7, the fourth sawdust passageway 70 is disposed adjacent to the rear segment of the band saw blade 243, and has a fourth intake port 72 which is disposed to collect sawdust attaching on the rear segment of the band saw blade 243, and a fourth outlet port 74 which is disposed downstream of the fourth intake port 72 and in fluid communication with the accommodation chamber 47.

With reference to FIGS. 5, 8 and 9, the impeller 50 is formed integrally with the lower blade mounting pulley 241, and is received in the casing space 35. The impeller 50 includes a connecting plate 51 which is formed integrally and rotated with the lower blade mounting pulley 241 and which has a center bore portion 511 for passage of the output shaft 231 of the motor 23, and a plurality of fins 52 which are formed on the connecting plate 51 distal to the lower blade mounting pulley 241 in the transverse direction and which are angularly displaced from one another about the axis. Each of the fins 52 is disposed to extend radially relative to the axis and in the transverse direction. As such, when the connecting plate 51 of the impeller 50 is rotated coaxially with the lower blade mounting pulley 241 about the axis by the drive force of the output shaft 231 of the motor 23, co-rotation of the fins 52 can draw the sawdust 90 in the accommodation chamber 47 from the first, second, third and fourth sawdust passageways 401,402,403,70 into the casing space 35 for discharge through the discharge port 36. Preferably, a sawdust bag 100 (see FIG. 3) is disposed to be connected to the discharge port 36.

Figure 6:
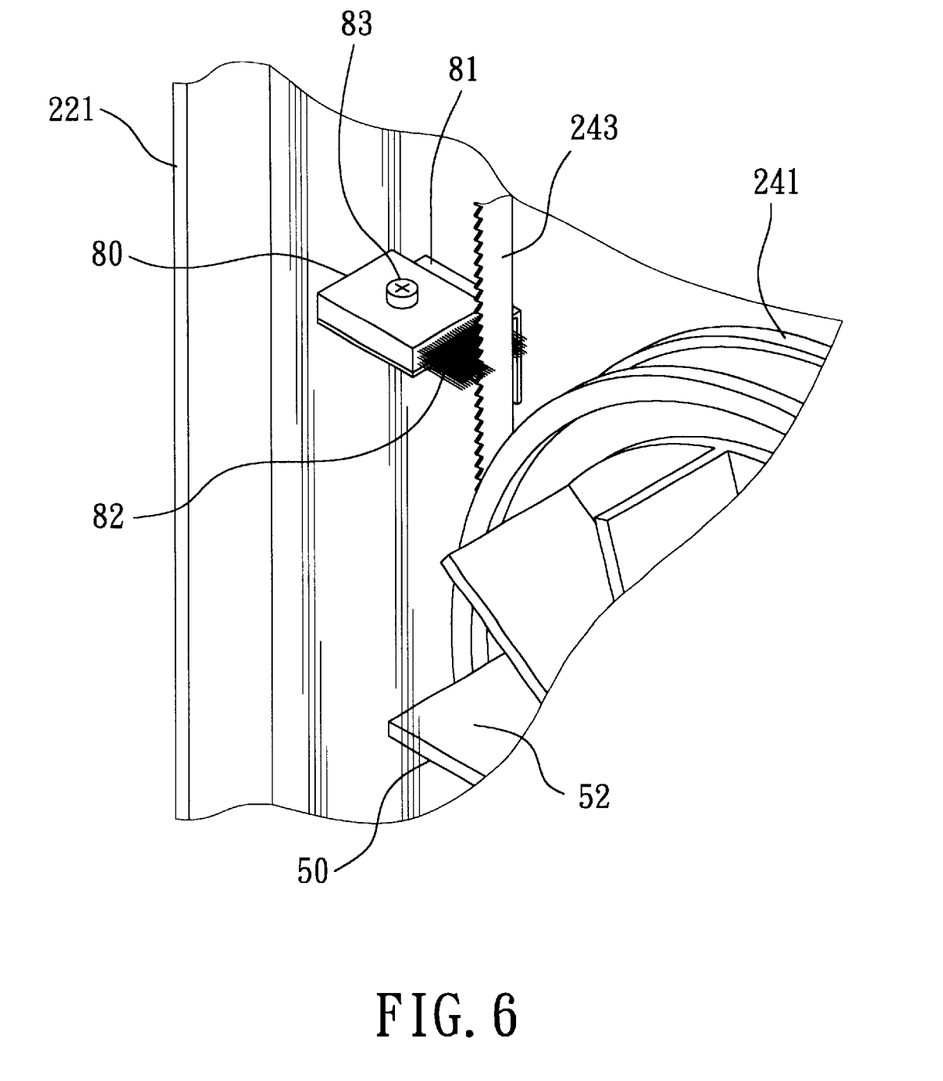
FIG. 6 is a fragmentary perspective view showing a dust removing member of the preferred embodiment.

Preferably, with reference to FIGS. 4 and 6, a dust removing member 80 includes a connecting portion 81 which is secured on the lower support 2211 by means of a screw 83 adjacent to the fourth sawdust passageway 70, and which has a dust removing portion 82 that includes a tuft of bristles and that extends yieldably and transversely into a running route of the rear segment of the band saw blade 243 so as to wipe sawdust off the rear segment of the saw blade 243.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A vertical band saw machine comprising:
    a base having a worktable adapted to support a workpiece thereon;
    a column mounted on said base, and having upper and lower supports disposed to be spaced apart from each other in an upright direction so as to confine a working space, said worktable being disposed to extend into said working space and between said upper and lower supports, and having a hole which extends therethrough in the upright direction;
    a motor having an output shaft which is rotatable to deliver a drive force;

a lower blade mounting pulley driven by the drive force of said output shaft, and mounted on and rotatable relative to said lower support about an axis oriented in a transverse direction relative to the upright direction;

an endless band saw blade trained on said lower blade mounting pulley, and passing through said hole;

a blower casing having proximate and distal walls opposite to each other in the transverse direction and respectively proximate to and distal from said lower blade mounting pulley to confine a casing space, and a discharge port which is disposed between said proximate and distal walls, which extends radially to the axis, and which is in fluid communication with said casing space, one of said proximate wall and said distal wall having an inlet port formed therethrough;

a sawdust collecting member mounted on said lower support, and having an accommodation chamber therein which is in fluid communication with and upstream of said inlet port, said sawdust collecting member further having a first sawdust passageway having a first intake port which is disposed above said worktable and in the vicinity of said hole to collect sawdust emanating and scattering around and above said worktable as a result of a sawing action, and a first outlet port which is disposed under said worktable and downstream of said first intake port and in fluid communication with said accommodation chamber, and a second sawdust passageway having a second intake port which is disposed under said worktable and in the vicinity of said hole to collect sawdust falling through said hole, and a second outlet port which is disposed downstream of said second intake port and in fluid communication with said accommodation chamber; and an impeller received in said casing space, and rotatable coaxially with said lower blade mounting pulley about the axis so as to draw the sawdust from said accommodation chamber into said casing space for discharge through said discharge port.

2. The vertical band saw machine of claim 1, wherein said output shaft of said motor extends along the axis, is coupled and rotated with said lower blade mounting pulley, and passes through said proximate wall of said blower casing toward said distal wall such that said impeller is coupled and rotated with said output shaft.

3. The vertical band saw machine of claim 2, wherein said impeller is formed integrally with said lower blade mounting pulley.

4. The vertical band saw machine of claim 3, wherein said impeller includes a connecting plate which is formed integrally and rotated with said lower blade mounting pulley, and a plurality of fins which are formed on said connecting plate distal to said lower blade mounting pulley in the transverse direction and which are angularly displaced from one another about the axis, each of said fins being disposed to extend radially relative to the axis and in the transverse direction so as to draw the sawdust into said casing space when said connecting plate is rotated with said lower blade mounting pulley.

5. The vertical band saw machine of claim 1, wherein said sawdust collecting member further has a third sawdust passageway which is disposed below said second sawdust passageway, said third sawdust passageway having a third intake port which is disposed to collect sawdust falling to a bottom side of said lower support of said column, and a third outlet port which is disposed downstream of said third intake port and in fluid communication with said accommodation chamber.

6. The vertical band saw machine of claim 1, wherein said sawdust collecting member includes a connecting tube having an inlet end which serves as said first intake port, and an outlet end which extends from said inlet end and which is in fluid communication with said accommodation chamber through a route extending along the axis.

7. The vertical band saw machine of claim 1, wherein said column further has a rear body interconnecting said upper and lower supports and disposed rearwardly of said worktable, said band saw blade having a rear segment which extends in the upright direction and which is received in said rear body, said sawdust collecting member further having a fourth sawdust passageway which is disposed adjacent to said rear segment of said band saw blade and which has a fourth intake port which is disposed to collect sawdust attaching on said rear segment, and a fourth outlet port which is disposed downstream of said fourth intake port and in fluid communication with said accommodation chamber.

8. The vertical band saw machine of claim 7, further comprising a dust removing member which is disposed on said lower support adjacent to said fourth sawdust passageway, and which has a dust removing portion that extends transversely and yieldably into a running route of said rear segment of said band saw blade so as to wipe sawdust off said rear segment.

9. The vertical band saw machine of claim 8, wherein said dust removing portion includes a tuft of bristles.

* * * * *